United States Patent [19]
Martin

[11] 4,108,622
[45] Aug. 22, 1978

[54] METHOD OF MAKING MINIATURE COUPLING LENS

[75] Inventor: William E. Martin, San Diego, Calif.

[73] Assignee: The United States of America as represented by the Secretary of the Navy, Washington, D.C.

[21] Appl. No.: 770,332

[22] Filed: Feb. 22, 1977

Related U.S. Application Data

[62] Division of Ser. No. 590,539, Jun. 26, 1975, Pat. No. 4,025,157.

[51] Int. Cl.$^2$ .............................................. C03C 21/00
[52] U.S. Cl. ..................... 65/30 R; 65/3 A; 65/30 E; 65/DIG. 7; 156/605; 156/606; 156/612; 264/1; 350/96.18; 350/175 GN
[58] Field of Search ............ 65/30 R, 30 E, 3 A, 65/DIG. 7; 156/605, 606, 612; 264/1; 350/96 R, 96 WG; 350/96 GN, 175 GN

[56] References Cited
U.S. PATENT DOCUMENTS

| | | | |
|---|---|---|---|
| 3,603,666 | 9/1971 | Uchida et al. ................. | 350/175 GN |
| 3,636,473 | 1/1972 | Young .......................... | 350/175 GN |
| 3,653,761 | 4/1972 | Hicks ............................ | 350/175 GN |
| 3,875,532 | 4/1975 | Kobayashi et al. .......... | 350/175 GN |
| 3,923,373 | 12/1975 | Dabby et al. ................. | 350/96 WG |
| 3,963,539 | 6/1976 | Kemlage ...................... | 156/612 |

*Primary Examiner*—Robert L. Lindsay, Jr.
*Attorney, Agent, or Firm*—R. S. Sciascia; G. J. Rubens; J. W. McLaren

[57] ABSTRACT

A miniature optical lens for coupling is fabricated from selected high refractive index semiconductor material of uniform thickness. Refractive index gradients are generated in the semiconductor material through changes in composition developed under controlled conditions producing a desired focal length for determinable wavelengths of light energy emitted from a light source to which the miniature optical lens is coupled. The miniature optical lens thus fabricated is especially efficient for coupling light energy from light emitting diodes and junction lasers as well as in semiconductor micro-optics within the visible and the infrared wavelengths as well because the index of refraction of the lens material may be closely matched to the index of refraction of the light source, minimizing light energy transfer losses.

7 Claims, 5 Drawing Figures

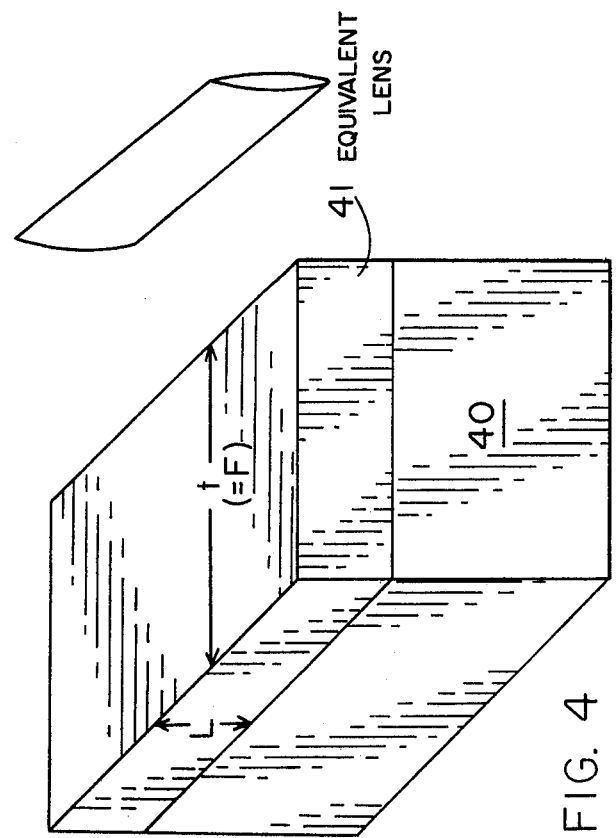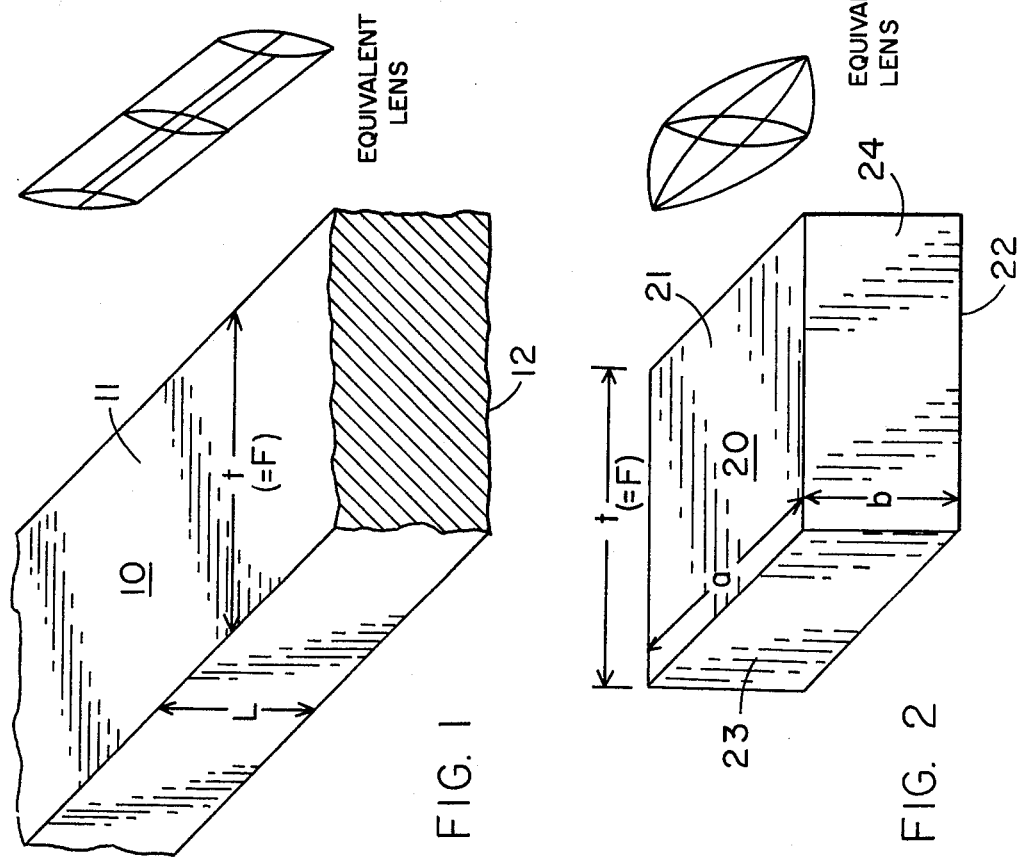

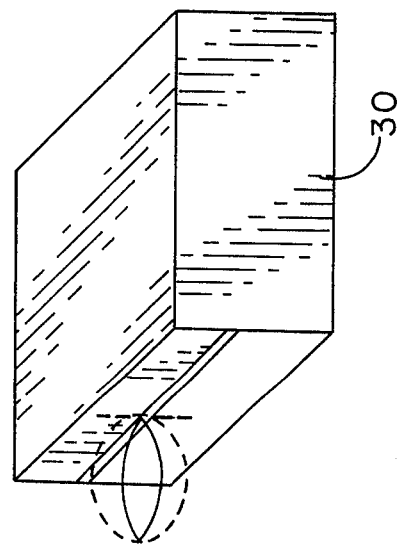
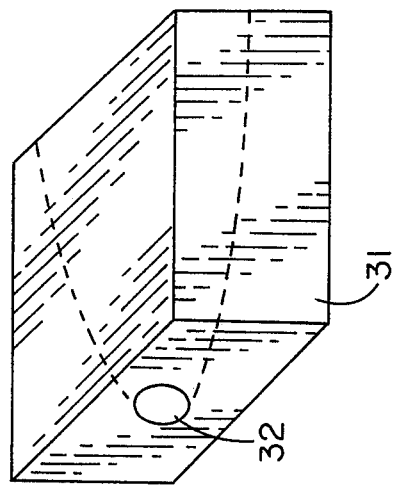
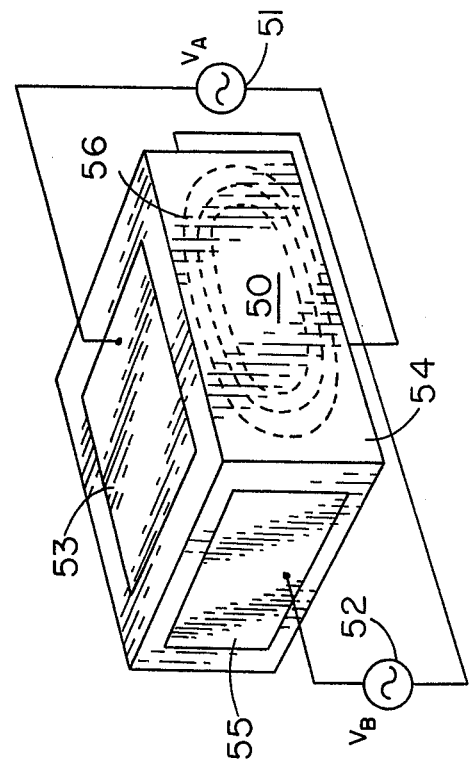
FIG. 5
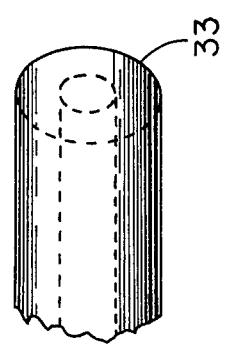
FIG. 3

METHOD OF MAKING MINIATURE COUPLING LENS

This is a division of application Ser. No. 590,539, filed June 26, 1975 now U.S. Pat. No. 4,025,157 granted 5-24-77.

BACKGROUND OF THE INVENTION

The more recently developed sources of light energy such as semiconductor junction lasers and light emitting diodes, for example, have found wide acceptance in use with integrated and fiber optics systems. However, in order to avail of the more desirable advantages of the advances incorporated in the technology of such recently developed sources of light energy, a means must be devised for efficiently coupling light emitted from the source into the receiving element such as a fiber optic transmission line, for example.

In the case of light sources such as semiconductor junction lasers and light emitting diodes, the emitting surface area is extremely small and as a consequence any device for coupling the emitted light energy out of the source and into the receiving element must be of commensurately small geometry. One means of accomplishing the desired coupling is through the use of extremely small miniature lenses of appropriate configuration. In the prior art the use of epoxy and arsenic/selenium glass lenses for coupling light energy out of light emitting diodes has been known and practiced for a considerable time.

For performing the coupling function efficiently it has been generally appreciated that if the material employed in the coupling lens has a refractive index which closely matches the refractive index of the emitting source of light energy, the efficient transfer of such energy will be maximized. For example, in a typical instance where light energy is coupled from a junction laser element into a fiber optic transmission line, the ideal lens for performing the coupling function will have a cylindrical configuration in terms of optical characteristics and a refractive index substantially matching the refractive index of the lasing material which may typically be of the order $N = 3.5$.

Non-conventional lens materials such as arsenic-selenium glass, for example, may be selected to provide the substantially matching index of refraction. However, the extremely small emitting surface area of a light energy source such as a light emitting diode (typically of the order of only one to several microns) makes the use of a conventional lens employing cylindrically configured surfaces, for instance, most difficult. Such conventional cylindrical lenses, would necessarily have an extremely small geometry defined by maximum dimensions of approximately no more than 10 to 100 microns, for example, and consequently conventional optical lens fabrication by the use of customary grinding and polishing techniques to generate the required curvatures of surfaces is thus rendered extremely difficult in any case, and virtually impossible in many cases.

SUMMARY OF THE INVENTION

The present invention contemplates a miniature optical lens of extremely small size for coupling determinable wavelengths of light energy from a similarly small size emitting surface area of a source of light energy such as a junction laser or a light emitting diode having a known index of refraction. The miniature optical lens comprises a selected semiconductor material which is transparent to the wavelengths of light energy to be coupled and is selected to have an index refraction which substantially matches the index of refraction of the material comprising the light energy source.

The semiconductor material of the miniature optical lens of the present invention is a composite material and is shaped in a configuration of pairs of parallel rectangular side surfaces, each such pair of surfaces being disposed orthogonally relative to each other pair. Such surfaces are obtainable by cleaving the semiconductor material along determinable natural cleavage planes. The composition of the semiconductor material of the miniature optical lens varies between at least one pair of the parallel rectangular flat surfaces for causing a predetermined gradient of refraction which produces a desired focal length for wavelengths of light energy transmitted orthogonal to the gradient index of refraction.

Those skilled and knowledgeable in the optical arts will appreciate that in conventional types of optical lens such as a cylindrical lens, for example, the thickness of customarily employed materials, such as glass, will vary from one extremity to another while the refractive index of the material is uniform throughout all its extremities.

The present invention, however, contemplates an optical element in which the index of refraction is varied within a semiconductor material from one extremity to another, while the thickness of the semiconductor material remains substantially constant throughout.

Since optical path length, which is determinative of the optical characteristics of an optical element, is essentially a function of the product of the (1) distance transversed by the light through the material, and (2) the refractive index of the material, the gradient change of either the thickness of the material or the index of refraction of the material between its extremities will determine the optical characteristics exhibited by any optical element.

The miniature optical lens and its method of fabrication as contemplated by the present invention is conceived to produce optical elements of extremely small geometries of the order of 10 to 100 microns, for example. Consequently, it is highly desirable that the miniature optical lens be fabricated of a uniform thickness, rather than having variations in thickness of material which determine optical path length, as is the case in most conventional lens fabrication.

Modern advanced techniques, such as ion diffusion controlled in the proper manner, can be employed to change the composition of a selected semiconductor material across an extremity from one surface to another to produce a desired gradient in its index of refraction. This will produce an optical characteristic in the semiconductor material having a desired focal length along an axis orthogonal to the gradient index of refraction for light energy received by the optical element from a direction essentially in alignment with that axis.

Moreover, since the variation in index of refraction required to achieve the desired optical effects is of the order of only approximately one percent, the semiconductor lens material refractive index remains substantially matched to that of the light energy source.

Alternatively, the miniature lens of the present invention may be fabricated by selecting a suitable substrate material which is adaptable to support epitaxial crystal deposition. First and second semiconductor materials are then selected for their quality of being transparent to the wavelengths of light energy desired to be coupled and also for having indices of refraction which are substantially of the order of the known index of refraction of the light source.

The first and second semiconductor material are then deposited in a composite on the substrate to a predetermined crystalline thickness. The composition of the resultant crystalline material is controllably varied from one surface to an opposite surface to cause a predetermined gradient index of refraction which, in turn, produces a desired focal length for determinable wavelengths of light energy transmitted along an axis orthogonal to the gradient index of refraction.

One technique for carrying out the epitaxial deposition method of fabricating the miniature optical lens in accordance with the concept of the present invention may include the step of vaporizing the first and second semiconductor materials and varying their relative concentration during epitaxial deposition to produce the predetermined gradient index of refraction in the resultant composite crystalline material.

Alternatively, the miniature optical lens conceived by the present invention may be fabricated by dissolving the first and second semiconductor materials and varying their relative concentration to produce the predetermined gradient index of refraction in the resultant composite epitaxially deposited material.

The present invention also conceives that the miniature optical lens of the present invention be of a size and dimension so that the surface which receives the light energy be substantially matched in size and configuration to the emitting surface area of the light source with which it is to be used, to thereby enhance and promote its most efficient operation in coupling light energy.

Those skilled and knowledgeable in the pertinent arts will readily appreciate that the concept of the present invention both as to the novel miniature lens and its methods of fabrication may be readily practiced through the employment of advanced techniques which are desirably controllable to produce predeterminable results.

Accordingly, it is a primary object of the present invention to provide a significantly improved miniature optical lens of extremely small dimensions.

Another most important object of the present invention is to provide an improved miniature optical lens which can be readily fabricated to match a light source such as a junction laser or light emitting diode both in index of refraction as well as size and configuration of the surface area receiving the emitted light energy.

A further object of the present invention is to provide a miniature optical lens which may be conveniently fabricated through the use of techniques which do not involve conventional grinding and polishing of optical material.

Yet another important object of the present invention is to provide an improved novel miniature optical lens which may be fabricated from a broad variety of readily available materials.

A concomitant object of the present invention is to provide a novel miniature optical lens which is readily adaptable to being fabricated in a large variety of lens configurations exhibiting a commensurately large diversity of optical characteristics and performance.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is a greatly enlarged representation of the optical miniature lens of the present invention;

FIG. 2 is a greatly enlarged representation of a variant miniature optical lens of the present invention;

FIG. 3 is a greatly enlarged representation of the combination of apparatus employing the miniature optical lens of the present invention for coupling purposes between the laser diode light source and an optical fiber waveguide;

FIG. 4 is a greatly enlarged representation of the miniature optical lens fabricated in accordance with a variant method as conceived by the present invention; and FIG. 5 is a greatly enlarged representation of the miniature optical lens of the present invention modified to perform an active modulating function.

DESCRIPTION OF THE PREFERRED EMBODIMENTS

The use of advanced technological light energy sources such as semiconductor junction lasers and light emitting diodes in integrated and fiber optics systems requires an efficient means for effectively coupling light out of such a light source into a receiving optical element such as an optical waveguide, for example, which may be part of such systems.

As discussed hereinbefore, the use of conventionally fabricated miniature lenses to perform this coupling function is not satisfactory because of the extremely small geometries of the emitting surface areas of such semiconductor junction lasers and light emitting diodes, for instance, which typically may have maximum dimensions of the order of 10 to 100 microns.

In this context, the term conventional optical lens is intended to mean a lens of material which is configured so that the material of the lens varies in thickness to cause a commensurate variation in the optical path length of light energy received by the lens in accordance with the particular position at which such light energy enters the lens material. It will be entirely evident to those knowledgeable and skilled in the optical arts that the fabrication of such conventional lenses by customary methods and techniques of grinding and polishing to produce miniature lenses wherein the major dimensions are of the order of 10 to 100 microns is extremely difficult, if not virtually impossible to any reasonable degree of practicality.

Moreover, it is highly desirable that the type of material used for such miniature optical lens has a refractive index which closely matches the refractive index of the emitting material in order to most efficiently couple the light energy without disadvantageous and undesirable high energy losses.

Refractive index changes can be produced in semiconductor material by composition changes of such semiconductor material induced by diffusion or caused to occur by controlled conditions of epitaxial deposition.

FIGS. 1 and 2 are greatly enlarged representations of miniature optical lens elements fabricated by use of the first of the two previously mentioned phenomena.

FIG. 1 comprises a selected semiconductor material which is transparent to wavelengths of light energy generated by the emitting surface area of a source of light energy having a known index of refraction. Preferably the semiconductor material of the miniature optical lens of the present invention is chosen to have an index of refraction substantially matching that of the source of light energy with which it is to be used.

The semiconductor material of the miniature optical lens of FIG. 1 is shaped to a configuration of pairs of parallel rectangular flat surfaces and includes at least one pair of such surfaces which are substantially matched in size and shape to the configuration of the emitting surface area of the source of light energy. The optical lens characteristics of the semiconductor material are controlled and determined by nonuniformly changing the composition between at least one of the pairs of parallel rectangular flat surfaces of the semiconductor material for causing a predetermined gradient index of refraction thereacross in the semiconductor material which produces a desired focal length for the wavelengths of light energy received by the miniature optical lens along an axis orthogonal to the gradient index of refraction.

Since the gradient index of refraction required to produce the desired optical effects in accordance with the concept of the present invention are of the order of approximately one percent, the suitably chosen semiconductor material will remain substantially matched to the refractive index of the light source.

Such gradient index of refraction may be induced in the miniature optical lens 10 of FIG. 1 by ion diffusion into the top surface 11 and its opposing rectangular flat surface 12. Penetration of the diffusant will cause a varying gradual gradient type of change in refractive index in accordance with the depth of such diffusion and concentration of the diffusant. The resultant compositional change in the semiconductor material 10 may be expressed by the equations $$C(x,t) \simeq 4/\pi C_o \mathrm{EXP}(-\pi^2 Dt/L^2)\mathrm{COS}(\pi x/L), \quad t > 5 \times 10^{-2} L^2/D \qquad (1)$$

$$C(x,t) \simeq 4/\pi C_o \mathrm{EXP}(-\pi^2 Dt/L^2)(1-\pi^2 x^2/L^2) \qquad (2)$$

where $x$ is measured from the center of the slice, $C(x,t)$ is the composition at position $x$ and time $t$, $C_o$ is the composition at $x,t = 0$, $2L$ is the thickness of the slice and $D$ is the diffusion constant for the particular process. If the refractive index is a linear function of composition then the form of equation (2) becomes $$N(x) = N_o(1 - ax^2/2) \qquad (3)$$

which defines a self focusing medium. Thus, by choosing an appropriate length of the diffusion material, orthogonal to the direction of diffusion a lens of focal length $f$ inside the material may be defined by $$F = \pi/2\sqrt{a}/f = 1/a\mathrm{Sin}(az) \qquad (4)$$

where $z$ is the length of the diffusion material.

In accordance with the concept and teaching of the present invention, the selected semiconductor material may be controllably diffused with a suitable diffusant to cause a gradient index of refraction between two opposing parallel faces as shown in FIG. 1 to provide an optical lens effect which is the equivalent of a planar cylindrical lens of the type illustrated alongside the illustration of FIG. 1 and labeled Equivalent Lens. The irregular edges of the material shown in FIG. 1 is intended to indicate that such edges may be formed by cleaving, a technique known to those skilled in the semiconductor electro-optics arts.

By diffusion into two pairs of orthogonally disposed parallel rectangular faces of selected semiconductor material, a two-dimensional cylindrical lens with different focal lengths on each axes can be fabricated in accordance with the concept and teaching of the present invention and is particularly suitable and well adapted for use with light emitting diodes and junction laser light sources.

As illustrated in FIG. 2 a bicylindrical lens 20 may be fabricated by diffusing into a first pair of parallel opposite rectangular faces of the semiconductor material 21 and 22, and also diffusing into a second pair of parallel opposite faces 23 and 24 of the selected semiconductor material. By appropriate masking, for example, such diffusion process may be carried out separately to insure control of the degree and penetration of such diffusion, as well as concentration of the diffusant material, to produce the desired gradient index of refraction and the resultant optical effects.

Alternatively, the dimensions of the semiconductor material can be chosen of different sizes and the diffusion results in a different focal length along the different dimensions orthogonal to the diffusion.

By diffusing a selected material into two parts of opposite orthogonally related faces of the selected semiconductor material a bicylindrical or two-dimensional cylindrical lens with a different focal length on each axes is produced which performs the optical function of the equivalent lens as shown alongside FIG. 2.

As illustrated in the expanded schematic representation of FIG. 3, if a light emitting diode or junction laser 30 is disposed adjacent one face of a bicylindrical miniature optical length of the present invention, 31, the light energy emerging from the substantially rectangular emitting surface area of the junction laser 30 will be focused into a symmetric spot 32 on the opposite face of the miniature optical lens 31 where the end of an optical fiber waveguide 33 may be butted for further transmitting such light energy. The illustration of FIG. 3 is shown in expanded form for purposes of simplicity of explanation; preferably the faces of the several related, co-acting elements will be positioned against each other for maximum efficiency of light energy transmission.

In accordance with the concept and teaching of the present invention, the same gradient index of refraction may be fabricated in a composition wherein the change is caused by control of the constitutents used in an epitaxial deposition. If it is assumed that there is a constant epitaxial deposition rate $D$ ($\mu m$/min), the composition vs time profile may be expressed as $$C = C_o + \Delta C \, \mathrm{SIN}(\pi dt/L) \qquad (5)$$

to the first approximation L is the total layer thickness desired and $C_o + \Delta C$ is the desired composition at the center of the element. If it is further assumed that the refractive index will be a linear function of the compostion, a graded index medium with the same refractive index profile as was previously described in connection with the diffusion process method of fabrication may be produced which is characterized by the same optical properties.

The fabrication of the miniature optical lens of the present invention may be performed by either of the two methods employing diffusion, or epitaxial growth and deposition through the choice of materials from an extremely broad class of substances which are readily adaptable to practice the present invention.

Tables I and II are a partial illustrative list of high refractive index semiconductor materials especially suited to the practice of the present invention in which it is known that refractive index changes can be produced by diffusion and epitaxial growth, respectively.

Table 1

| Refractive Index Changes By Diffusion | |
|---|---|
| Reaction | Increase/Decrease N |
| ZnSe + Cd | Inc |
| ZnSe + S | Dec |
| ZnSe + Te | Inc |
| CdS + Se | Inc |
| CdS + Te | Inc |
| CdS + Zn | Dec |
| ZnS + Cd | Inc |
| ZnS + Se | Inc |
| ZnS + Te | Inc |
| ZnTe + Se | Dec |
| ZnTe + Cd | Inc |
| CdTe + Zn | Dec |
| CdTe + S | Dec |
| CdTe + Se | Dec |
| CdSe + S | Dec |
| CdSe + Te | Inc |

Table 2

| Refractive Index Changes by Composition (x) Change During Deposition (Epitaxy) | |
|---|---|
| System | N for Increasing x |
| $Zn_xCd_{1-x}Se$ | Dec |
| $ZnSe_xTe_{1-x}$ | Dec |
| $ZnS_xTe_{1-x}$ | Dec |
| $ZnSe_xS_{1-x}$ | Inc |
| $CdS_xSe_{1-x}$ | Dec |
| $Cd_xZn_{1-x}S$ | Inc |
| $CdS_xTe_{1-x}$ | Dec |
| $CdSe_xTe_{1-x}$ | Dec |
| $Ga_xAl_{1-x}As$ | Inc |
| $Ga_xIn_{1-x}As$ | Dec |
| $GaAs_xI-x$ | Inc |
| etc. (any II-VI, III-V compounds which can be grown together) Quaternary compositional changes are also possible, i.e. $(ZnSe)_x(GaAs)_{1-x}$ | |

Those knowledgeable and skilled in the optical arts will appreciate that most of the semiconductor materials listed have excellent transmission properties in the infrared wavelength as well as in the visible wavelengths making them especially suitable and desirable for infrared optical systems use.

FIG. 4 illustrates an embodiment of the present invention fabricated in accordance with its concept and teaching, employing the phenomena of epitaxial growth by deposition in accordance with controlled conditions. This method includes the steps of selecting a suitable substrate material adaptable to support epitaxial crystal deposition, then causing the deposition of a composite comprising first and second selected semiconductor materials upon such substrate in a predetermined crystalline thickness.

The first and second semiconductor materials which are deposited upon the substrate form a uniform crystalline thickness within which its composition is varied from one surface to another surface to cause a predetermined gradient index of refraction which, in turn, produces a desired focal length for determinable wavelengths of energy along an axis orthogonal to the gradient index of refraction.

In a preferred embodiment of the present invention as illustrated in FIG. 4, the crystalline thickness of the composite epitaxially deposited semiconductor material will have dimensions across the face of the gradient index of refraction which are substantially equal to the dimensions of the emitting surface area of the source of light energy with which it is to be used. In this manner, a highly efficient coupling is produced by the optical characteristics, i.e., those of the equivalent lens illustrated alongside the drawing of FIG. 4.

The concept of the present invention further includes an added modification by reason of which the passive optical elements described and illustrated in FIGS. 1, 2, 3, and 4 may be rendered optical lens modulators responsive to modulate light energy in accordance with an input modulating signal which may, for example, be of the electrical type.

FIG. 5 is a greatly enlarged and simplified illustration of the manner in which the passive optical lens fabricated in accordance with the present invention may be employed to modulate light energy passing therethrough.

In accordance with the concept of the present invention, miniature optical lens element 50 may be caused to operate as an optical lens modulator through modulating effects impressed upon it by signal sources 51 and 52. If the material of the miniature optical lens 50 is acousto-optic in nature and the elements 53 and 54 are opposing electro-acoustic transducers, the miniature optical lens 50 will modulate the light energy passing therethrough as a function of the modulating signal impressed upon the electro-acoustic transducers 53 and 54.

Similarly, in another axis orthogonal to that previously described, if the elements 55 and 56 comprise oppositely positioned electro-acoustic transducers, the acousto-optical material of the miniature optical lens 50 will respond to the modulation as a function of the modulating signal 52 impressed thereon.

As an alternative, the pairs of elements 52 and 54, as well as 55 and 56, may be piezo-electric devices which will respond to input modulating signals from the modulating signal sources 51 and 52, respectively, to impress mechanical stress on the miniature optical lens material 50 to produce resultant modulation as a function of such modulation signals.

Similarly, if the material 50 is an electro-optically responsive material (as many semiconductor materials are) the use of pairs of electrically conductive plates in the form of elements 53, 54, and 55 and 56, respectively, will impress electrical fields across the miniature optical lens 50 as illustrated in FIG. 5 so that it becomes an optical lens modulator responsive to the modulating signals originating from the signal modulator sources 51 and 52.

Those knowledgeable and skilled in optical arts will readily appreciate that the concept of the present invention produces a unique and highly useful miniature optical lens as well as a unique method of fabrication. The ease of fabrication of such high optical quality miniature focusing elements in high refractive index semiconductor materials provides numerous advantages which cannot be realized through the use of conventional optical fabrication techniques.

The use of high refractive index material to match the relatively high refractive index of desirable sources of light energy such as junction lasers and light emitting diodes is a significant advantage. Although certain arsenic/selenium glasses exhibit refractive indices which are substantially as high as the refractive indices of semiconductor materials employed in accordance with the teaching of the present invention, the mechanical properties of such glasses is extremely poor rendering them most difficult to employ in fabrication of optical elements by conventional optical manufacturing techniques.

Moreover, the minute physical size range of optical elements which are fabricated in accordance with the teaching of the present invention is precisely the size range desired and necessary for efficiently coupling light energy out of junction lasers and light emitting diodes.

Additionally, the requisite gradient of the index of refraction to obtain the desired optical properties is only of the order of one percent. Thus, the index of refraction of the semiconductor remains substantially that initially chosen to match the index of refraction of the light source, insuring highly desirable efficiency in the transfer of light energy.

Obviously many modifications and variations of the present invention are possible in the light of the above teachings. It is therefore to be understood that within the scope of the appended claims the invention may be practiced otherwise than as specifically described.

What is claimed is:

1. A method of fabricating a miniature optical lens for coupling determinable wavelengths of light energy from the emitting surface area of a source having a known index of refraction comprising:
   selecting a semiconductor material transparent to said determinable wavelengths of light energy and having an index of refraction substantially matching that of said source;
   shaping said material to a configuration of pairs of parallel rectangular flat surfaces of maximum dimensions less than one hundred microns including at least one such surface substantially the same in size and shape as said emitting surface area;
   inducing gradual variation in the composition of said semiconductor material between at least one of said pairs of parallel rectangular flat surfaces for causing a predetermined gradient index of refraction thereacross in said semiconductor material, producing a desired focal length for said determinable wavelengths of light energy along on axis orthogonal to said gradient index of refraction.

2. A method of fabricating a miniature optical lens as claimed in claim 1 including the step of inducing variation in the composition of said semiconductor material across two orthogonal principal axes to produce an optical lens having dual focal lengths.

3. A method of fabricating a miniature optical lens as claimed in claim 1 wherein different pairs of flat surfaces have different dimensions for producing a different effective focal length relative to each of at least two axes.

4. A method of fabricating a miniature optical lens as claimed in claim 1 wherein the step of inducing variation in the composition of said semiconductor material includes ion diffusion into opposite surfaces of said material.

5. A method of fabricating a miniature optical lens as claimed in claim 1 wherein the step of inducing variation in the composition of said semiconductor material includes ion diffusion into two pairs of opposite surface of said material.

6. A method of fabricating a miniature optical lens for coupling determinable wavelengths of light energy from the emitting surface area of a source having a known index of refraction comprising:
   selecting a substrate material adaptable to support epitaxial crystal deposition;
   selecting first and second semiconductor materials transparent to said determinable wavelengths of light energy and having indices of refraction substantially of the order of said known index of refraction;
   depositing on said substrate a composite of said first and second materials in a predetermined uniform crystalline thickness having pairs of parallel rectangular flat surfaces of maximum dimensions less than one hundred microns; and
   controlling the deposition for varying the relative concentrations of said first and second materials in the composition of the crystalline material from one said rectangular surface to an opposite parallel said rectangular surface to cause a predetermined gradient index of refraction, producing a desired focal length for said determinable wavelengths of light energy along an axis orthogonal to said gradient index of refraction.

7. A method of fabricating a miniature optical lens as claimed in claim 6 including the step of dissolving the first and second semiconductor materials and varying their relative concentration to produce the predetermined gradient index of refraction in the resultant composite deposition.

* * * * *